Patented Aug. 14, 1928.

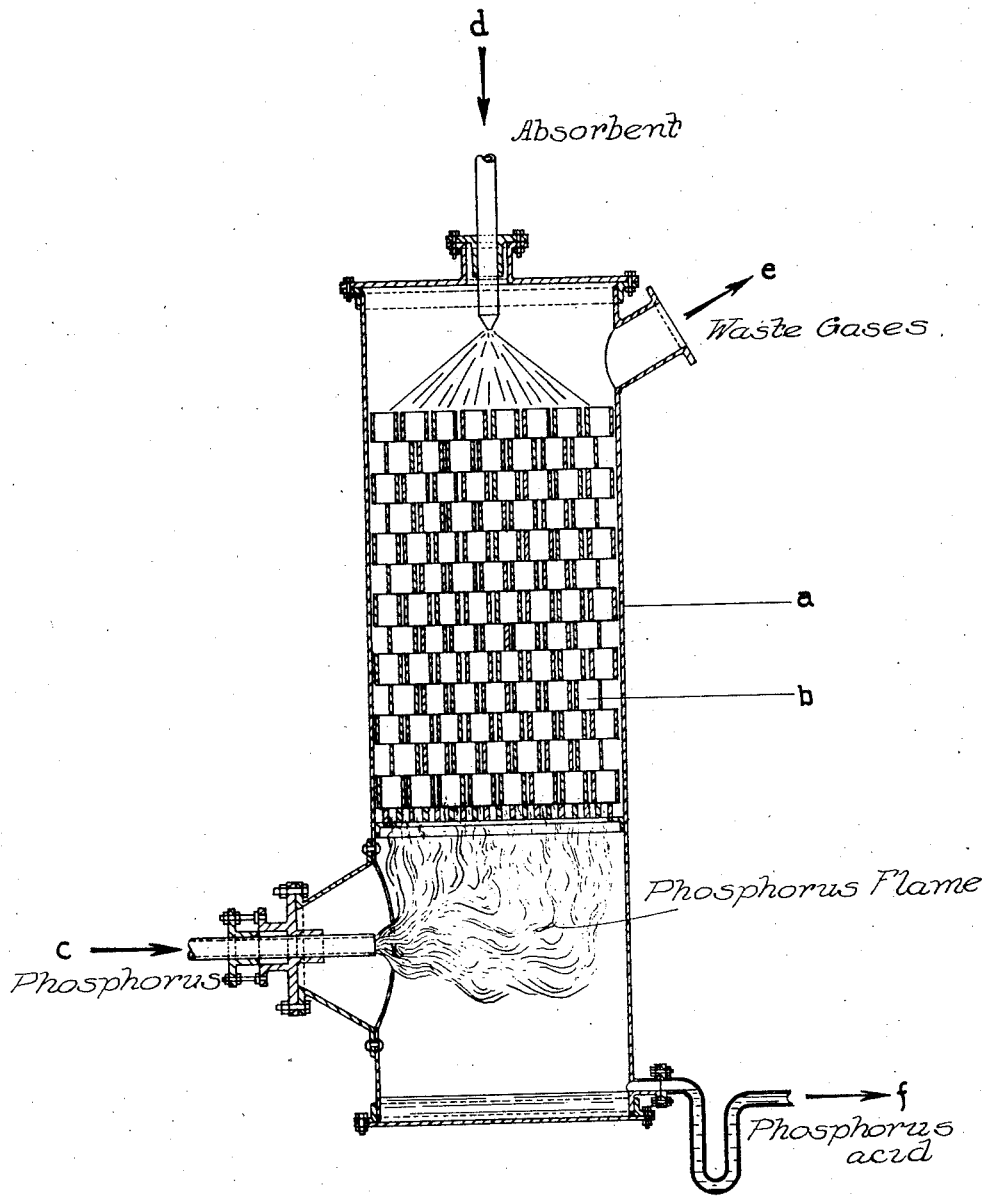

1,680,625

UNITED STATES PATENT OFFICE.

HERMANN LANG, OF BITTERFELD, GERMANY, ASSIGNOR TO I. G. FARBENINDUSTRIE, AKTIENGESELLSCHAFT, OF FRANKFORT, GERMANY.

PROCESS OF PRODUCING PHOSPHORIC ACID.

Application filed October 20, 1925, Serial No. 63,791, and in Germany October 23, 1924.

This invention relates to the production of phosphoric acid, more especially to the method of producing this acid by burning phosphorus or gas mixtures containing phosphorus and absorbing the phosphorus pentoxide thus formed by water.

It is well known that phosphorus pentoxide is liable to form a fog which is difficult to condense. Now I have found that this fog of phosphorus pentoxide may easily be dissolved in hot water or in a hot solution of phosphoric acid of any concentration. This may be obviously seen from the following experiment: If a mixture of phosphorus pentoxide and air is passed through a ten balls absorption pipette filled with water of common temperature, the phosphoric acid is only imperfectly dissolved, as may easily be discerned from the gas spaces of the balls being filled with white vapours. However on heating the solution in the absorption pipette nearly to its boiling-point, the phosphorus pentoxide is so vehemently dissolved that the gas spaces of the balls are at once clarified and become perfectly transparent.

In carrying out this process on an industrial scale, I may utilize the combustion heat of the burning phosphorus for simultaneously heating the absorption chambers; for instance the phosphorus flame may be made to burn into a tower filled with suitable filling material which is irrigated from the top with hot water or phosphoric acid solution. By suitably adjusting the quantity of water it is possible to obtain an 80 to 90 per cent solution of phosphoric acid leaving the tower, whereas at the top only water vapour containing little traces of phosphoric acid escapes.

The process may also be applied to the electrothermic production of phosphoric acid under combustion of the phosphorus vapour in the furnace by a supply of air. Hitherto, for the purpose of obtaining a high-concentrated acid in this process, one has generally employed the "Cottrell process" for separating the pentoxide fog. However this process requires costly apparatus, whereas the process according to my invention may be carried out with simple, well-known devices.

An apparatus for carrying into practice my invention is illustrated in the accompanying drawing, in which $a$ is an absorbing tower, filled with little cylinders $b$ of acid-proof material. The phosphorus vapor is injected through pipe $c$, and the absorbent is introduced through pipe $d$. The flame spreads in the lower part of the tower as shown. The gases, after the absorption of the phosphorus pentoxide, leave the tower through the tubulure $e$, and the phosphoric acid is withdrawn by the trap or the like $f$.

I claim:—

1. In the art of making phosphoric acid by burning phosphorus that improvement which comprises directing the phosphorus flame into an absorption tower, and absorbing therein the resulting pentoxide with a hot diluted solution of phosphoric acid.

2. In the art of making phosphoric acid by burning phosphorus contained in a gaseous mixture that improvement which comprises directing the phosphorus flame into an absorption tower, and absorbing therein the resulting pentoxide with a hot diluted solution of phosphoric acid.

In testimony whereof I affix my signature.

HERMANN LANG.